United States Patent [19]

Urano et al.

[11] Patent Number: 4,577,952
[45] Date of Patent: Mar. 25, 1986

[54] PHOTOGRAPHIC CAMERA HAVING A DIAPHRAGM ACTUATOR WITH PRELIMINARY DISPLACEMENT FOR LENS COMPENSATION

[75] Inventors: Fumio Urano; Zenichi Okura; Masahiro Kawasaki, all of Tokyo, Japan

[73] Assignee: Asahi Kogaku Kogyo Kabushiki Kaisha, Tokyo, Japan

[21] Appl. No.: 584,521

[22] Filed: Feb. 28, 1984

[30] Foreign Application Priority Data

Feb. 28, 1983 [JP] Japan ................................. 58-32589

[51] Int. Cl.⁴ ............................................. G03B 17/18
[52] U.S. Cl. .................................. 354/455; 354/286; 354/289.12
[58] Field of Search ............ 354/441, 444, 455, 271.1, 354/286, 289.11, 289.12, 442

[56] References Cited

U.S. PATENT DOCUMENTS

| | | | |
|---|---|---|---|
| 4,146,317 | 3/1979 | Date et al. ........................... | 354/442 |
| 4,331,401 | 5/1982 | Numata ............................... | 354/442 |
| 4,357,089 | 11/1982 | Okura et al. ....................... | 354/271.1 |
| 4,360,257 | 11/1982 | Kurei ................................... | 354/441 |
| 4,395,106 | 7/1983 | Kawasaki et al. ................... | 354/455 |
| 4,426,147 | 1/1984 | Shiozawa et al. ................... | 354/286 |
| 4,477,161 | 10/1984 | Kawasaki et al. ................... | 354/271.1 |

*Primary Examiner*—Russell E. Adams
*Attorney, Agent, or Firm*—Christie, Parker & Hale

[57] ABSTRACT

A camera has a displaceable actuator in a diaphragm adjustable between a maximum aperture value and a minimum aperture value responsive to displacement of the actuator. A first signal representative of the displacement of the actuator is generated. A second signal representative of a fraction of an exposure quantity dependant on film sensitivity and subject light is generated. Responsive to the second signal, the exposure time of the camera is set. At least partially responsive to the second signal, a third signal representative of the desired aperture value of the diaphragm for correct exposure is generated. The first and third signals are compared. Upon shutter release, the actuator is displaced and the diaphragm is maintained at the maximum aperture value during an initial portion of the displacement of the actuator to compensate for the characteristics of the particular interchangeable lens connected to the camera body. Responsive to the comparison, displacement of the actuator is arrested when the first and second signals assume a predetermined relationship, which establishes the desired diaphragm aperture value for correct exposure. The desired diaphragm value and shutter speed are also displayed.

12 Claims, 5 Drawing Figures

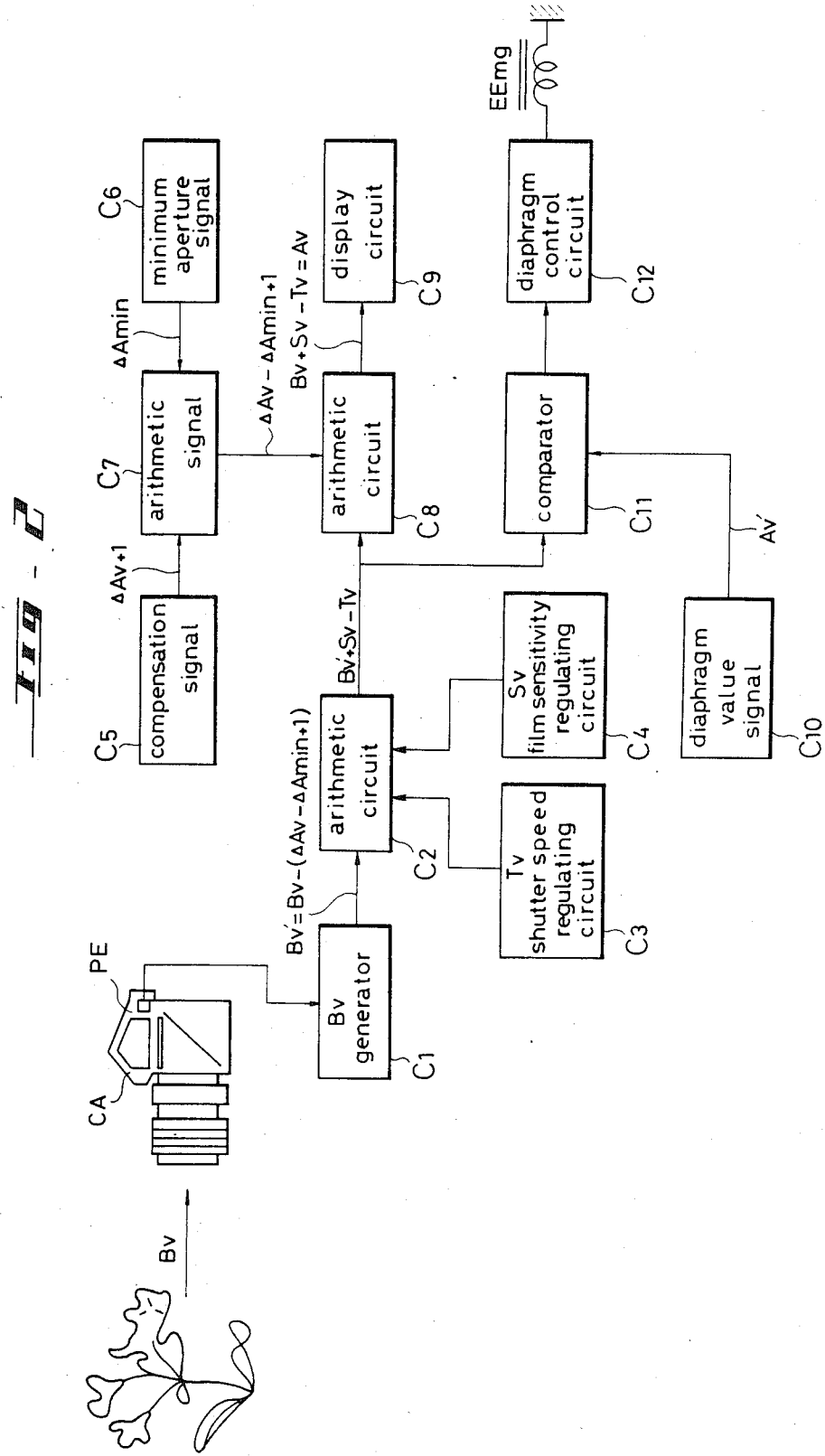

4,577,952

PHOTOGRAPHIC CAMERA HAVING A DIAPHRAGM ACTUATOR WITH PRELIMINARY DISPLACEMENT FOR LENS COMPENSATION

BACKGROUND OF THE INVENTION

The present invention relates to a method for exposure control and method for display of a diaphragm value and/or shutter speed in a shutter speed priority mode and in a programmed mode in a multimode photographic camera such that a signal representative of information peculiar to an individual interchangeable lens is subjected together with the other exposure factors to arithmetic processing to effect exposure control or display of a shutter speed and/or a diaphragm value.

The present invention presupposes an exposure control system in a camera body which system is, in turn, based on a specified lens (hereinafter referred to as a reference lens). When a desired interchangeable lens (hereinafter referred to as a desired lens) other than the reference lens has been mounted on said camera, some deviations are inevitable between the reference lens and said desired lens—for example, light intensity error in the film plane and light intensity error as measured at the position of a photometric element (hereinafter collectively referred to as the primary quantity of error) and the difference in the fully opened aperture. Such quantities of error need to be compensated for in some manner and the present invention provides a method for exposure control and a method for display of diaphragm value and/or shutter speed to meet this need.

In the shutter speed priority mode, if diaphragm control is directly based on a diaphragm value calculated from information on brightness of an object to be photographed, said information provided by a photometric element exposed to the light coming from said object through a desired lens actually mounted on said camera, information on shutter speed given as a resistance value as a shutter dial is operated, and information on film sensitivity given also as a resistance value as a film sensitivity dial is operated, there would occur an inevitable error and no appropriate diaphragm control would be possible, because the exposure control system in the camera body is constructed on the basis of the reference lens. This is true also in case of the programmed mode.

The present invention, therefore, provides a novel method for the purposes as previously mentioned such that a compensation signal for said primary quantity of error, a signal representative of the minimum aperture and the like are transmitted from the lens to the camera body to achieve more accurate exposure control or display of diaphragm value and/or shutter speed.

SUMMARY OF THE INVENTION

According to the invention, programmable exposure control and/or display are provided in a camera having interchangeable lenses with a preliminary displacement prior to diaphragm stop down. Specifically, a camera has a displaceable actuator in a diaphragm adjustable between a maximum aperture value and a minimum aperture value responsive to displacement of the actuator. A first signal representative of the displacement of the actuator is generated. A second signal representative of a fraction of an exposure quantity dependant on film sensitivity and subject light is generated. Responsive to the second signal, the exposure time of the camera is set. At least partially responsive to the second signal, a third signal representative of the desired aperture value of the diaphragm for correct exposure is generated. The first and third signals are compared. Upon shutter release, the actuator is displaced and the diaphragm is maintained at the maximum aperture value during an initial portion of the displacement of the actuator to compensate for the characteristics of the particular interchangeable lens connected to the camera body. Responsive to the comparison, displacement of the actuator is arrested when the first and second signals assume a predetermined relationship, which establishes the desired diaphragm aperture value for correct exposure.

According to a feature of the invention, the desired diaphragm value and shutter speed are displayed.

BRIEF DESCRIPTION OF THE DRAWINGS

The features of a specific embodiment of the best mode contemplated of carrying out the invention are illustrated in the drawings in which:

FIG. 2 is a schematic block diagram of a prior art exposure control system;

DETAILED DESCRIPTION OF THE SPECIFIC EMBODIMENT

Figure 1:
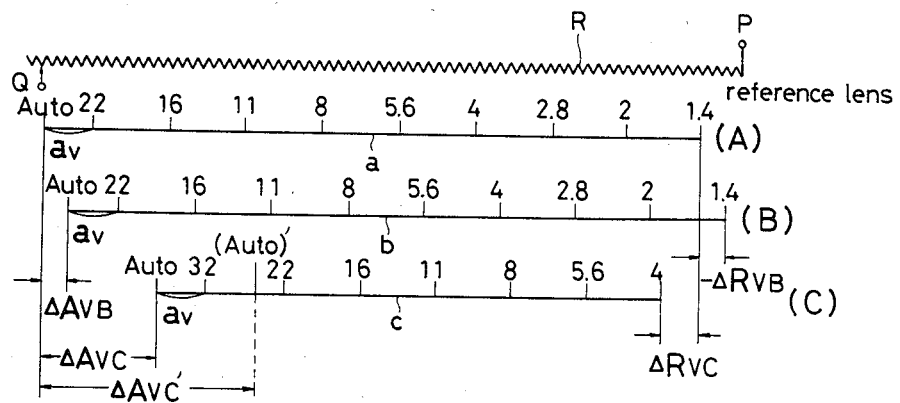
FIG. 1 is a schematic diagram illustrating the relationship between different parameters of a plurality of interchangeable lenses as represented by resistance values selected by a lever operatively associated with a diaphragm preset ring.

Prior to describing the present invention itself, the content of said primary quantity of error will be considered in more detail. Generally, in a single lens reflex camera of interchangeable lens type, it is well known that, when a photometric operation is done within the camera through an interchangeably mounted lens with the diaphragm of said lens being fully opened (so called TTL photometry with fully opened diaphragm), using a measured light value directly for automatic exposure control operation would lead to a great error between an exposure value to be set and said measured light value so that a photographing result with proper exposure would not be obtained.

Such deviation or error can be classified into one component error due to optical characteristics of individual lenses interchangeably mounted on the camera and one due to the specific position at which the light receiving element is located within the camera. The former is caused by the fact that the lens aperture stopped down by a diaphragm adapted to be preset by a diaphragm preset ring at the moment of photographing cannot produce an accurate multiple proportional variation of actual illumination intensity in the film plane corrresponding to a multiple proportional variation of preset diaphragm value marked around the diaphragm preset ring. More specifically, individual interchangeable lenses are different in their lens materials, arrangement of lens elements and assembling modes, so that the illumination intensity in the film plane, which depends on a light transmissivity characteristic, a vignetting effect peculiar to each lens, and the effective illumination intensity in the film plane obtained with respective diaphragm values for each interchangeable lens, is substantially reduced relative to that obtained with a reference lens. With the effective value of the illumination intensity in the film plane thus substantially reduced, a resultant value of the photometric operation cannot be directly utilized to obtain a proper exposure, since it would be impossible, from this resultant value, to produce a multiple proportional variation of exposure exactly or acceptably corresponding to the multiple proportional variation of successive preset values and thereby to obtain an exposure time corresponding to a preset diaphragm value. Such error appearing in the film plane due to variation of illumination intensity depending upon individual interchangeable lenses is referred to herein as the illumination intensity error in the film plane.

The photometric element exposed to the light coming through the lens with fully opened diaphragm is preferably located just in the film plane so that said photometric element may be operatively coupled to an exposure meter or utilized for automatic exposure control to obtain a proper exposure. However, if the photometric operation is actually performed exactly in the film plane, the photometric element would be a critical obstacle for film exposure in photographing so a possible solution would be to locate the photometric element not in the film plane itself but at a position which is equivalent to said film plane or causes little photometric deviation from the value which would be obtained from the photometric operation performed exactly in the film plane. Such photometric position equivalent to the film plane may be, for example, a position of a focusing plate on which the light reflected by a mirror is focused and this position is, in fact, preferred in that this position is in a conjugate relationship with the film plane. However, this position would be an obstacle not only for the user's view through a viewfinder, but also for the user's focus adjusting operation. Accordingly, the photometric element has usually been located, in most cases, on the light exit end surface of a pentagonal-dachkant-prism or similar optical system for reflection and inversion of light which is mounted on the focusing plate, particularly along the periphery of a viewfinder eyepiece so that a viewing therethrough should not be prevented. Even such position of the photometric element has encountered the problem that a photometric result is obtained as a value slightly lower or darker than the illumination intensity actually given in the film plane, since the position of the photometric element is deeper than the position of the focusing plate which is practically equivalent and conjugate to the film plane by the length of the optical reflection and inversion path defined by said prism and there occurs more or less light absorption by said prism. It will be obvious that such location of the photometric element does not achieve the intended photometric effect exactly equivalent to that obtained from the photometric operation performed just in the film plane and necessarily subjected to an error depending upon a focal length of each interchangeably mounted lens. The error of this type is referred to herein as the illumination intensity error due to the position of the photometric element.

Thus, the respective errors as above mentioned inevitably appear as various quantities of deviation from the actual photometric values which should be obtained through the fully opened diaphragm no matter whether the objective has the same value of fully opened diaphragm or the same focal length. (Detail of these errors is illustrated and described in the specification of Japanese Patent Application No. 41(1966)-49771, the disclosure of which is incorporated herein by reference.)

Therefore, to make proper exposure control and to display proper shutter speed and/or diaphragm value in the shutter speed priority mode or the programmed mode in a multimode camera, it is necessary to perform exposure control and display of such shutter speed and-/or diaphragm value by considering the primary quantity of error.

Now procedures for compensation of said errors will be considered with respect to the photographic camera of diaphragm value priority type and the compensator means according to the present invention will be described along these procedures for better comprehension. Referring to FIG. 1, R designates a variable resistor provided in the camera body, of which a resistance value is selectively set by a lever operatively associated with a diaphragm preset ring of respective lens interchangeably mounted on the camera. Specifically, a resistance value of said variable resistor R peculiar to a given preset diaphragm value is set as said diaphragm preset ring is rotated to said given preset diaphragm value. Even when one objective has the same fully opened diaphragm value as another lens, the respective effective values of illumination intensity in the film plane are different from each other at their fully opened diaphragm values so far as they are different in their lens designs or other aspect. When they are the same in their fully opened diaphragm values but different in their focal distances, there occurs, in addition to a variation of the illumination intensity error in the film plane, a variation of the illumination intensity error due to the position of the photometric element. As a result, the resistance value of the variable resistor R selected by the lever of each lens at the fully opened diaphragm value should be peculiar to this lens.

In view of the fact that the lenses interchangeably mounted on the camera may be the same both in their fully opened diaphragm values and in their focal lengths but different in their lens designs, or the same in their focal lengths but different in their fully opened diaphragm values, or the same in their fully opened diaphragm values but different in their focal lengths, and so on, one lens which is considered most standard is chosen as the reference lens on the basis of which all the other different lenses are subjected to desired compensation so that the levers operatively associated with the diaphragm preset rings of the respective interchangeable lenses may select proper resistance values at their fully opened diaphragm values. It is obvious that, also with such reference lens (hereinafter referred to as the reference lens A and illustrated by FIG. 1), the effective illumination intensity in the film plane is lower than the level according to the associated nominal diaphragm value so far as the fully opened diaphragm value or a range of values adjacent thereto is concerned while a series of multiple proportional diaphragm values within a range of relatively small diaphragm values bring about substantially multiple proportional variation of illumination intensity in the film plane. Obviously, a photometric result is influenced not only by such general characteristics but also by the illumination intensity error due to the position of the photometric element.

Based on the illumination intensity error in the film plane and the illumination intensity error due to the position of the photometric element determined with respect to the reference lens A (for example, having a fully opened diaphragm value of F 1.4), the lever operatively associated with the diaphragm of this reference lens A is adapted to be driven and positioned so that respective preset diaphragm values corresponding to regular interval graduations on the diaphragm preset ring which are representative of multiple proportional diaphragm values may result in proper selection of respective resistance values utilized for arithmetic opration of the photometric circuit of the automatic exposure control circuit, then a relative position relationship between the variable resistor R in the camera body of which the resistance value is selected by the lever operatively associated with the diaphragm value preset ring of the reference lens A as a given diaphragm value is preset on one hand, and the diaphragm preset ring a adapted to drive said lever operatively associated with the diaphragm preset ring on the other hand would be as illustrated by (A) of FIG. 1. With this position relationship, a lens B being the same in its fully opened diaphragm value F 1.4 but different in the other aspects has its diaphragm preset ring b positioned as illustrated by (B) of FIG. 1 and further another lens C having a smaller lens opening with its diaphragm preset ring c positioned as illustrated by (C) of FIG. 1. It should be noted here that the positional relationship has been illustrated in FIG. 1 as the relative positions of the respective diaphragm values of the preset ring when the diaphragm values of the respective lenses are preset to their fully opened diaphragm values to facilitate understanding of various features of the present invention which will be described later.

By adjustably rotating the diaphragm preset ring of the respective lenses A, B, and C from such relative positional relationship, both the illumination intensity error in the film plane and the illumination intensity error due to the position of the photometric element are so effectively compensated that not only a photometric signal corresponding to the actual illumination intensity in the film plane produced through the fully opened diaphragm is transmitted to an arithmetic section of the photometric circuit or the exposure control circuit but also a given diaphragm value preset by rotating the diaphragm preset ring from the respective original positions properly brings about a correspondingly multiple proportional value of exposure.

Such method of error compensation falls under a classification in which the information on diaphragm value applied to the arithmetic section of the exposure control circuit according to the diaphragm value priority mode is replaced by a resistance value selected by a given preset diaphragm value. When this method of error compensation is applied to the shutter speed priority mode in which an exposure time is set with priority and then the lens is stopped down to a diaphragm value corresponding to a resistance value which will give a proper exposure, the result will be as follows. A resistance value determined by the stopping down has already contained therein a compensation corresponding to the previously mentioned primary quantity of error and, therefore, this resistance value may be substituted as an arithmetic factor into the arithmetic processing for automatic exposure regulation to regulate a quantity of operation for automatic exposure control so that both diaphragm and shutter speed may be automatically controlled in the programmed-controlled exposure mode. When exposure control, with the compensation for the primary error included, is performed by presetting a position for automatic diaphragm control on the diaphragm preset ring of an interchangeably mounted lens at a predetermined angular or rotational distance (corresponding to $a_v$ as illustrated and in the case, $a_v \geq 0$) from the rotational position for the fully closed diaphragm value, ng to $a_v$ as illustrated and in the case, $a_v \geq 0$) from the rotational position for the fully closed diaphragm value, such preset position for automatic diaphragm control varies by individual interchangeable lenses. An example is illustrated by FIG. 1. The diaphragm preset ring a of the reference lens A has its automatic diaphragm control marking (AUTO) at an angular distance $a_v$ from the marking of the fully closed diaphragm value F 22. The diaphragm preset ring b of the lens B has the same fully opened diaphragm value and fully closed diaphragm value as the reference lens A and bears thereon its peculiar preset position for automatic diaphragm control (AUTO) at an angular distance $\Delta AvB$ from the corresponding position for the reference lens A. There is a lever operatively associated with the diaphragm of lens B which is compensated for the illumination intensity error in the film plane and the illumination intensity error due to the position of the photometric element. Similarly, the diaphragm preset ring c of the lens C has its peculiar preset position (AUTO) for automatic diaphragm control at an angular distance $\Delta AvC$ from the corresponding position for the reference lens A when the fully closed diaphragm value is at F 32 and at an angular distance $\Delta Av'C$ when the fully closed diaphragm value is at F 22. As will be readily understood, these angular distances or deviations generally designated by $\Delta Av$ are caused by the deviations ($-\Delta RvB$ for the lens B and $\Delta RvC$ for the lens C) due to a difference in the point from which the diaphragm preset ring is operated, which depends, in turn, upon the fully opened diaphragm value and other characteristics peculiar to each lens actually mounted on the camera.

As will be obvious from the foregoing description, said primary quantity of error appears in the form of a difference between the resistance value selected by the lever operatively associated with the diaphragm for the variable resistor in the camera body when the diaphragm preset ring of the reference lens A has been set to its AUTO position and a resistance value selected by the lever operatively associated with the diaphragm of a desired lens for the variable resistor in the camera body when the diaphragm preset ring of said desired lens has been set to its AUTO position. With the resistance value corresponding to the AUTO position on the diaphragm preset ring of the reference lens A having previously been stored in a memory in the camera body, the diaphragm preset ring of the desired lens, after the latter has been mounted on the camera body, may be set to its AUTO position to cause the lever operatively associated with the diaphragm to transmit the resistance value corresponding to the AUTO position of this desired lens to the variable resistor on the camera body. Thus, said difference between the resistance value associated with the reference lens A which has previously been stored in the memory on the camera body and the resistance value associated with the desired lens can be utilized as an electric information signal representative of the primary quantity of error (corresponding to a compensation signal $C_5$ as will be described later).

However, in view of the fact that the AUTO position is located at a predetermined distance from the fully closed diaphragm value peculiar to the individual lens, there would occur a problem if the fully closed diaphragm value of a desired lens differs from that of the reference lens on the basis of which the AUTO position of said desired lens is set. In such case, additional information besides said primary quantity of error would be involved, for example, by 1 EV if the reference lens has its fully closed diaphragm value of F 22 while said desired lens has its fully closed diaphragm value of F 32, when said desired lens is mounted on the camera body and then its diaphragm preset ring is set to the AUTO position. To achieve a proper diaphragm control, it is essential to eliminate the deviation between the fully closed diaphragm value of the desired lens and the fully closed diaphragm value of the reference lens.

The deviation due to different fully closed diaphragm values depending upon the respective interchangeable lenses is transmitted from the lens interchangeably mounted on the camera to the camera body as an information signal (i.e., the minimum aperture signal $C_6$ as will be described later) for the automatic exposure control, and the deviations such as said $-\Delta RvB$ and $\Delta RvC$ ($\Delta Rv$ in general) which can be known in advance, inclusive of the light intensity error in the film plane and the light intensity error due to the position of the photometric element are also utilized as electric information signals so as to achieve automatic exposure control of high precision in the multimode camera.

From the basic conception discussed above, an arithmetic expression established when the diaphragm preset ring has been set to the automatic diaphragm control position (AUTO) will be considered with reference to FIG. 2. This expression is given in the following form according to the exposure time regulation priority mode (or the shutter speed priority mode), assuming that all the units are represented by EV values.

$$Av = Bv' + Sv - Tv + \Delta Av - \Delta Amin + 1 \quad \text{(i)}$$

wherein:
Av—diaphragm value
Bv'—the subject light, i.e., brightness value of object to be photographed after transmission through the lens
Sv—sensitivity value of film used for photographing
Tv—shutter speed value set with priority
$\Delta Av$—deviation from reference lens A
$\Delta Amin$—a difference between the fully closed diaphragm value of the reference lens A and the fully closed diaphragm value of each lens interchangeably mounted on the camera; with respect to the fully closed diaphragm value F 22 of the reference lens A, as illustrated by FIG. 1, $\Delta Amin = 0$ when the lens to be mounted on the camera has a fully closed diaphragm value of F 32, and such information is transmitted simultaneously from the lens to the arithmetic circuit in the camera body as the deviation or difference signal when the lens is interchanged. (1 is the EV value given relative to the fully opened diaphragm value F 1.4 of the reference lens A.)

The diaphragm value Av obtained by the previously mentioned expression (i) has already been incorporated in the compensation of the illumination intensity error in the film plane and the illumination intensity error due to the position of the photometric or light receiving element. In the case in which the diaphragm value is preset by rotation of the diaphragm preset ring in the diaphragm value priority mode, instead of relying upon the automatic diaphragm control (AUTO), the shutter speed can be obtained by mutually transferring the terms Av and Tv in said expression (i) namely, $$Tv = Bv' + Sv - Av + \Delta Av - \Delta Amin + 1 \quad \text{(ii)}$$

The exposure control and its value may be used for display within the viewfinder.

Moving Av to the left side and substituting Ev for Av+Tv leads to the formula $$Ev = Bv' + Sv + \Delta Av - \Delta Amin + 1 \quad \text{(iii)}$$

This Ev value may be utilized to achieve the exposure control in the programmed mode. The relationship between Tv and Ev can be expressed by $$Tv = k_1 Ev + k_2$$

where $k_1$ and $k_2$ are constants representative of a given combination of a diaphragm value and a shutter speed in a programmed exposure control. Once said Ev value has been calculated, it is easily possible to calculate Tv and it is also easy to obtain Av from the relation $Ev = Av + Tv$.

Operation of the automatic diaphragm control is accomplished when a member provided in the camera body operatively associated with the shutter release drives a release plate in the lens and thereupon the release plate is displaced from a position at which the diaphragm mechanism is held fully opened to a position at which said diaphragm mechanism reaches a given EV value. The displacement quantity of said release plate is in linear proportion to the quantity of stopping down and, therefore, the Av value obtained from said expression (i) cannot be directly utilized as a control value for the diaphragm. When a value, for example, $Av = 5$ (F 5.6) is used as the arithmetic operation value for the diaphragm control, stopping down by a quantity of 4 EV results in stopping down to F 5.6 so far as a lens having its fully opened diaphragm value of F 1.4 ($Av = 1$), in this case, when the fully opened diaphragm value of the lens is F 4 ($Av = 4$), F 5.6 ($Av = 5$) can be obtained by stopping down of the lens by a quantity corresponding to 1 EV. Thus, the EV quantity necessary for a desired quantity of stopping down is obtained in the form of a difference or deviation between the EV value as a result of the arithmetic operation and the fully opened diaphragm expressed in Ev value and the Pv expressed in EV value as the control quantity is given by the following formula $$\begin{aligned} Pv &= Bv' + Sv - Tv + \Delta Av - \Delta Amin + 1 - Amax \\ &= Av - Amax \end{aligned} \quad \text{(iv)}$$

where Amax represents the EV value at the fully opened diaphragm depending on individual lenses interchanged. Namely, an EV value of Pv representing a required quantity of control varies by the different maximum diaphragm value of each interchangeable lens. Thus, it will be practically difficult and even disadvantageous to extract Amax signals in said formula (iv) with respect to all the interchangeable lenses over a wide variety and then to transmit them to the camera body in view of factors such as a space for incorporation, the cost thereof and reliability of operation. To overcome such problem the present invention proposes that an error in the automatic diaphragm control due to the differences of the fully opened diaphragm values, the illumination intensity error in the film plane which is characteristic of each lens, and the illumination intensity error due to the position of photometric element be compensated by a special operation of the member taking part in the diaphragm control, namely, the diaphragm driving member in the camera body or a member operatively associated therewith to bring the diaphragm mechanism to a position corresponding to the desired diaphragm value.

The term "a special operation" used herein means the part in the course of operation of an operative system starting from said diaphragm driving member in the camera body and terminating in the diaphragm blades that directly takes no part in stopping said diaphragm blades down to the desired diaphragm value. This operation taking no part directly in stopping down will be referred to herein as a preliminary displacement. The quantity of displacement of the members constituting said operative system during said operation taking no part in stopping down, namely, before the operation for stopping down the diaphragm blades actually starts to stop the lens aperture down beyond the fully opened diaphragm to the desired value for control of the light quantity, will be referred to herein as the quantity of preliminary displacement. Further description of how to introduce the quantity of preliminary displacement is described in U.S. Pat. No. 4,395,106 issued July 26, 1983, the disclosure of which is incorporated fully herein by reference.

Figure 5:
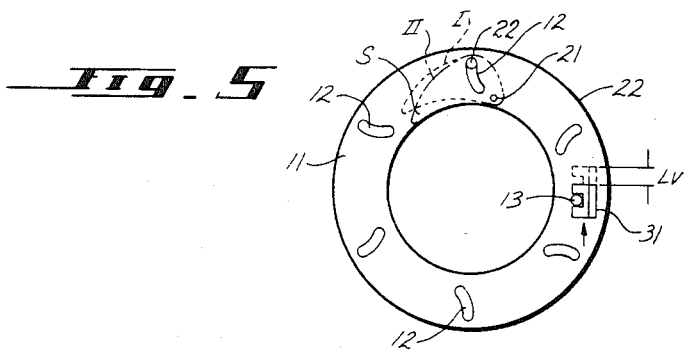
FIG. 5 is a rear view of a mechanism for introducing a value of preliminary displacement in accordance with the invention.

FIG. 5 shows how the quantity of preliminary displacement may be introduced. S designates one of diaphragm blades forming together an iris diaphragm and 11 designates a diaphragm blade actuating ring which rotates the diaphragm blades S around associated pivot pin 21. Said diaphragm blade actuating ring 11 itself is adapted to be rotated around the optical axis with respect to a stationary part of the lens barrel. The numeral 12 designates a plurality of cam grooves formed in said diaphragm blade actuating ring 11 and a driven pin 22 on each blade S is adapted to be engaged with each groove. On the side of said diaphragm blade actuating ring 11, there is provided a fixed pin 13 adapted to be engaged with a release plate 31 which is, in turn, driven by the diaphragm driving member actuated in the camera body in operative association with the operation of shutter release. The diaphragm blade actuating ring 11 is potentially biased by a spring in the direction opposed to the direction indicated by an arrow in FIG. 5 so that said diaphragm blade actuating ring 11 normally tends to open the iris diaphragm towards its fully opened position. The position of the release plate 31, as illustrated, corresponds to the starting position of this release plate 31, at which the respective diaphragm blades S take their positions I indicated by broken lines. The inner edge of each diaphragm blade S is situated inwardly of a circumferential opening which defines the maximum aperture of this lens. From these positions, the respective diaphragm blades S are rotated around the respective pivot pin 21 with its associated driven pin 22 being guided along the associated cam groove 12 as the release plate 31 is urged upward by the diaphragm driving member or a transmission member thereof in the direction indicated by the arrow and thereby the diaphragm blade actuating ring 11 is rotated via the pin 13, until the respective diaphragm blades S reach their positions II indicated by chain lines, at which their inner edges are brought in coincidence with said circumferential opening defining the maximum aperture of the lens. The positions II of respective blades S correspond to the positions of blades in the fully opened diaphragm. Further rotation of the diaphragm blade actuating ring 11 actually begins to stop the lens down beyond the positions II of the respective diaphragm blades S. Thus, during movement from the positions I to the positions II, the respective diaphragm blades S have no function of incident light quantity control and operation of the release plate 31 takes no part in actual operation for stopping down. The operation of said release plate 31 from the starting position to the position illustrated by broken lines corresponds to the preliminary displacement and a quantity of such displacement Lv is given as the quantity of preliminary displacement. Although this quantity of preliminary displacement occurs as a relative movement of the release plate 31 and the diaphragm blades S in the embodiment illustrated in FIG. 5, this may be set as a relative movement between the diaphragm driving member in the camera body and said release plate 31, as shown in FIG. 6 of U.S. Pat. No. 4,395,106.

Substitution of $$\Delta Av - \Delta Amin + 1 - Amax = \neq 31, \text{ as shown in FIG. 6 of U.S. Pat. No. 4,395,106.}$$

Substitution of $$\Delta Av - \Delta Amin + 1 - Amax = \Delta Rv \qquad (v)$$

into said formula (iv) and replacement of the value corresponding to ΔRv depending on the individual lenses by said quantity of preliminary displacement make disappear the Amax signal in EV corresponding to the fully opened diaphragm value from said formula (iv) and the EV value of Pv as a control quantity is given by $$Pv = Bv' + Sv - Tv \qquad (vi)$$

Thus, by incorporating the primary quantity of error together with the deviation of the fully opened apertures between the reference lens and a desired lens into said quantity of preliminary displacement, the illumination intensity error depending on the individual interchangeable lenses and the illumination intensity error due to the position of the photometric element can be effectively compensated without use of an electrical signal representative of the fully opened diaphragm value.

Now the manner in which the automatic diaphragm control and the display of diaphragm value and/or shutter speed are performed on the basis of such arithmetic formulae will be, by way of example, illustrated by and described in connection with FIG. 2, wherein CA designates a camera and Bv designates a brightness of an object to be photographed. It has previously been mentioned that a light quantity coming from the object having its brightness Bv through the lens and to which a photometric element PE is exposed, takes an inherent value depending on a fully opened aperture of this lens, a light absorption coefficient, an internal reflection and vignetting effect of this lens and other factors. An output provided from the photometric element PE is log-compressed by a Bv' generator $C_1$ in the form of $$Bv' = Bv - (\Delta Av - \Delta Amin + 1) \qquad (1)$$

and is then applied to an arithmetic circuit $C_2$ to which is also applied an information signal Tv based on the exposure time (shutter speed) set with priority and another information signal Sv based on the sensitivity of the film in use from a shutter speed regulating member $C_3$ and a film sensitivity regulating member $C_4$, respectively. Thus, the arithmetic circuit $C_2$ provides a resultant information signal as follows $$Bv' + Sv - Tv \qquad (2)$$

When an interchangeable lens is mounted on the camera CA and its diaphragm preset ring is rotated to the automatic diaphragm control position (AUTO), a value $\Delta Av$ peculiar to this lens and a constant value 1 added thereto through a circuit processing is $$\Delta Av + 1 \qquad (3)$$

which is the output from a compensation signal member $C_5$ and input to an arithmetic circuit $C_7$. On the other hand, there is applied to the arithmetic circuit $C_7$ an information signal $$\Delta Amin \qquad (4)$$

which corresponds to a deviation of a fully closed diaphragm value peculiar to this lens from the fully closed diaphragm value of the reference lens A from a minimum aperture signal member $C_6$. As a result, the arithmetic circuit $C_7$ provides a resultant output $$\Delta Av - \Delta Amin + 1 \qquad (5)$$

This output is applied together with the output expressed by the formula (2) coming from said arithmetic circuit $C_2$ to an arithmetic circuit $C_8$ in which an arithmetic operation (2)+(5) is performed.

$$Bv' + Sv - Tv + \Delta Av - \Delta Amin + 1 = Av$$

Substitution of $Bv'$ from formula (1) gives $$Bv + Sv - Tv = Av \qquad (6)$$

and thus it is possible to obtain an Apex quantity Av of the diaphragm value.

Such Av value can be displayed within a viewfinder by a display circuit $C_9$ consisting, for example, of a meter. The information signal Av subjected to this display merely indicates a diaphragm value providing a proper exposure with respect to the exposure time (shutter speed) set with priority but not the automatic control quantity previously mentioned. To effect stopping down with the automatic diaphragm control quantity Pv in operative association with the operation of shutter release, said output (2) provided from the arithmetic circuit $C_2$ and the diaphragm value signal Av' formed by a diaphragm value signal generator member $C_{10}$ according to the actual diaphragm value of the lens are applied to a comparator circuit $C_{11}$ so that these two signals are compared to each other in said comparator circuit. When the output Av' reaches said output Av, the coincidence signal output is applied to a diaphragm control circuit $C_{12}$ and thereby a diaphragm control magnet EEmg is released, with an effective result that the diaphragm value is adjusted to said Av corresponding to the arithmetic result.

Figure 3:
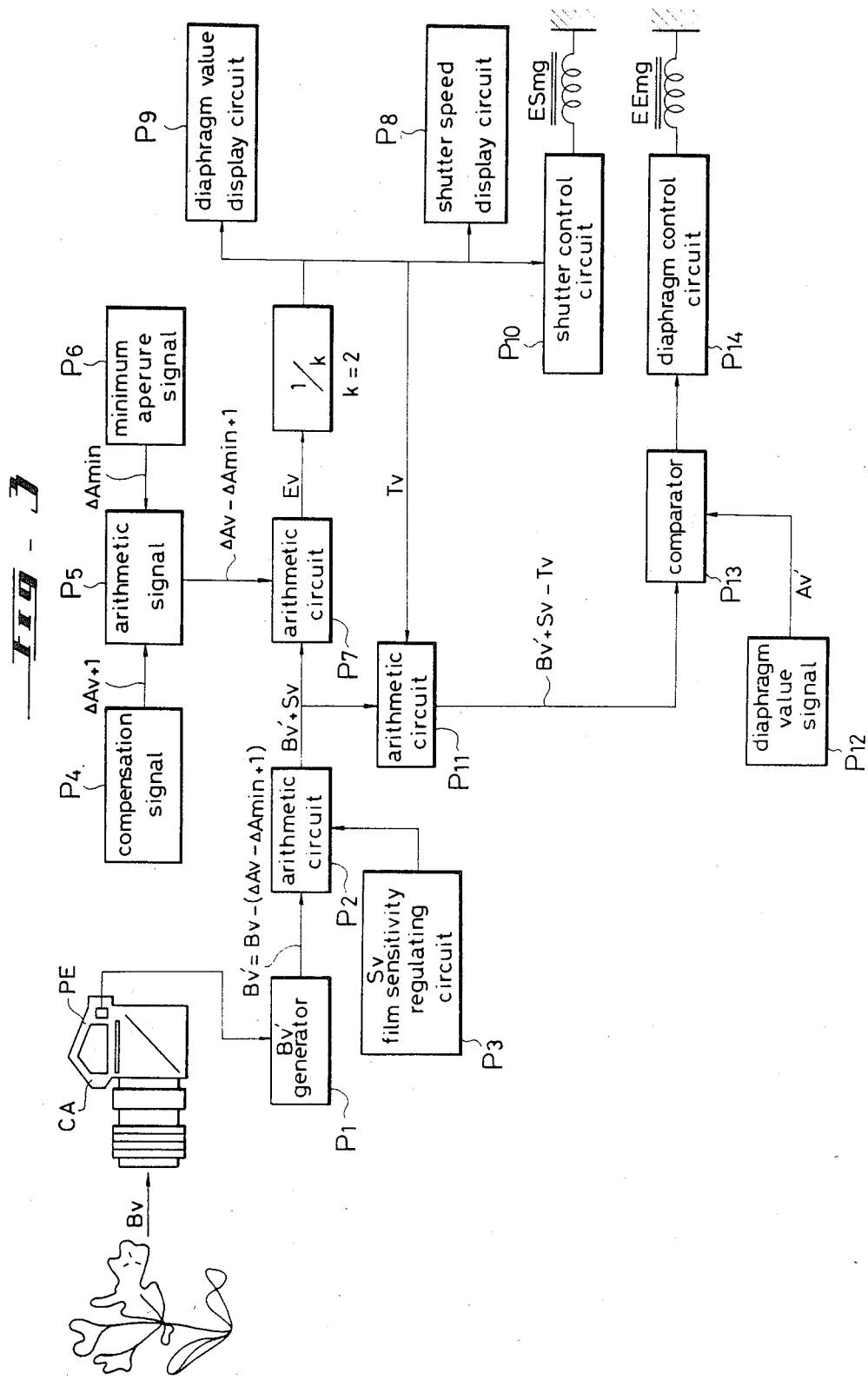
FIG. 3 is a schematic block diagram of an exposure control system incorporating principles of the invention.

FIG. 3 illustrates by way of example the manner in which the programmed control is performed on the basis of said arithmetic formulae. In FIG. 3 also, CA designates a camera and Bv designates the brightness of an object to be photographed.

It has previously been mentioned that a light quantity coming from the object having its brightness Bv through the lens and to which a photometric element PE is exposed takes an inherent value depending on a fully opened aperture of this lens, a light absorption coefficient, an internal reflection and vignetting effect of lens elements constituting this lens, and other factors. An output provided from the photometric element PE is log-compressed by a $Bv'$ generator $P_1$ in the form of $$Bv' = Bv - (\Delta Av - \Delta Amin + 1) \qquad (A)$$

and then applied to an arithmetic circuit $P_2$ to which is also applied an information signal Sv based on the sensitivity of the film in use from a film sensitivity regulating member $P_3$. Thus, the arithmetic circuit $P_2$ provides a resultant information signal as follows $$Bv' + Sv \qquad (B)$$

When an interchangeable lens is mounted on the camera CA, then its diaphragm preset ring is rotated to the automatic diaphragm control position (AUTO) and a shutter dial on the camera body is adjusted to the programmed position. A value $\Delta Av$ peculiar to this lens plus a constant 1 added thereto through a circuit processing, i.e., $$\Delta Av + 1 \qquad (C)$$

is the output from a compensation signal member $P_4$ and the input to an arithmetic circuit $P_5$. On the other hand, there is applied to the arithmetic circuit $P_5$ from a minimum aperture signal member $P_6$ an in formation signal $$\Delta Amin \qquad (D)$$

which corresponds to the deviation of a fully closed diaphragm value peculiar to this lens from the fully closed diaphragm value of the reference lens A.

As a result, the arithmetic circuit $P_5$ provides a resultant output $$Av - Amin + 1 \qquad (E)$$

This output is applied together with the output expressed by said formula (B) coming from said arithmetic circuit $P_5$ to an arithmetic circuit $P_7$ in which an arithmetic operation (B)+(E) is performed.

$$Bv' + Sv + \Delta Av - \Delta Amin + 1 = Ev = (Av + Tv)$$

Substitution of $Bv'$ from the formula (A) gives $$Bv + Sv = Ev = (Av + Tv) \qquad (F)$$

and thus it is possible to obtain an exposure quantity Ev.

Such Ev value may be used to achieve desired exposure control, and display of diaphragm value and shutter speed in the programmed mode.

Thus, a formula $$Tv = k_1 Ev + k_2$$

is obtained, wherein $k_1$ and $k_2$ are constants representative of a combination of diaphragm value and shutter speed in the programmed exposure control mode (for better understanding, in the embodiment of FIG. 3, $k_1 = \frac{1}{2}$ and $k_2 = 0$). This Tv value can be displayed in the viewfinder by a shutter speed display circuit $P_8$ comprising a member such as a meter. As previously mentioned, it is easily possible to obtain an Av value from the relation $Ev = Tv = Av$ and this Av value also can be displayed in the viewfinder by a diaphragm value display circuit $P_9$ comprising a member such as a meter. Furthermore, input of said Tv value to a shutter control circuit $P_{10}$ to control ESmg permits a shutter period (duration) member such as a trailing curtain member to be controlled according to this Tv value. This sets the exposure time of the camera. An overall block diagram showing trailing curtain control magnet ESmg in relationship to the other photographic operations is provided in FIG. 1 of U.S. Pat. No. 4,360,257.

Input of said Tv value to an arithmetic circuit $P_{11}$ and arithmetic processing of this Tv value in said arithmetic circuit $P_{11}$ together with $Bv' + Sv$ provided from the arithmetic circuit $P_2$ give $$Bv' + Sv - Tv \tag{G}$$

which is then compared in a comparator $P_{13}$ with a diaphragm value signal $Av'$ corresponding to the actual diaphragm value of the desired lens and generated from a diaphragm value signal generator $P_{12}$. At the moment, the output $Av'$ reaches said output (G), a signal output is applied to a diaphragm control circuit $P_{14}$ and thereby the diaphragm control magnet EEmg is released so that the diaphragm value may be controlled according to the Av value as the result of said arithmetic processing. It is obvious that the mode switching is effected by well-known electrical and mechanical means. U.S. Pat. No. 4,360,257 discloses one embodiment of diaphragm control circuit $P_{14}$ and diaphragm control magnet EEmg. The disclosure of this patent is incorporated fully herein by reference. Reference is also made to U.S. Pat. No. 4,360,257 for a disclosure of a typical embodiment of diaphragm value signal generator $P_{12}$.

Figure 4:
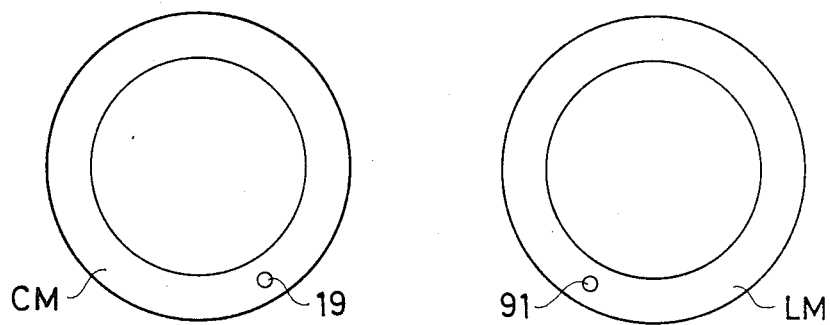
FIG. 4 is a front view of a camera body and a rear view of an interchangeable lens illustrating the mounts on such camera body and lens with electrical contacts.

With respect to the camera and the lens according to the automatic diaphragm control mode which is incorporated with the compensation for a difference in the fully opened diaphragm values of the respective lenses interchangeably mounted on the camera and the compensation for a difference in the speeds of stopping down operation thereof, a preferred embodiment of the lens mounting arrangement by which the signals characterizing individual lenses are transmitted from the lens to the camera body is illustrated by FIG. 4.

Referring to FIG. 4, a portion designated by reference symbol CM corresponds to a mount on the camera for mounting of a lens while a portion designated by reference symbol LM corresponds to a mount on the lens. Both the mount CM on the camera body and the mount LM on the lens are shown at their surfaces along which they are mutually abutted, namely, the mount CM is shown as seen from the camera front while the mount LM is shown as seen from the rear side of the lens. Both the mounts are provided with a pair of opposed contacts by which ON and OFF signals are transmitted in the form of binary codes and these contacts are sometimes utilized for carrying of the electric current depending on various electrical factors such as resistance value which is, in turn, determined by the fully closed diaphragm value and the other electrical quantity. There are provided one or more pairs of contacts 19 and 91 through which the information on the fully closed diaphragm value depending on individual lens mounted on the camera and on the automatic diaphragm control position (AUTO) determined by said fully closed diaphragm value are transmitted from the lens to the camera body. It is through this pair(s) of contacts that the $\Delta$Amin signal determined by said fully closed diaphragm value is transmitted in analog or digital form from the lens to the camera body. This pair(s) of contacts constitutes a part of the fully closed aperture signal generating member $C_6$, $P_6$ shown in FIGS. 2 and 3. For further details of exemplary contact arrangements, see U.S. Pat. No. 4,357,089, issued Nov. 2, 1982, the disclosure of which is incorporated fully herein by reference.

As will be obvious from the foregoing description in detail, the present invention enables an operation of stopping down at the highest precision by the automatic diaphragm control through the operation of stopping down which already includes therein the compensation, by a simple mechanism, of a different maximum diaphragm value of each interchangeable lens, the illumination intensity variation depending on individual interchangeable lenses mounted on the camera and the illumination intensity error due to the position of the photometric element depending on various factors of this lens. In spite of achievement of such high precision exposure control, the present invention advantageously simplifies the mount construction along which the interchangeable lens is coupled to the camera body since it is unnecessary, in accordance with the present invention, to transmit the information signal related to the fully opened diaphragm value of the respective lenses from the latter via the lens mount to the camera body so as to be incorporated into the regulating factors for the exposure control circuit which is also simplified in its construction according to the present invention and particularly no means is required to change over the fully opened diaphragm signal in order to compensate the change of F value when a zoom lens accompanied with said change of F value is mounted on the camera. The present invention accordingly provides the desired interchangeable lens single-lens reflex camera of automatic exposure control type which is simple as well as compact in its overall construction, obtainable at a low cost and almost trouble free.

What is claimed is:

1. Method for display of diaphragm value and shutter speed in a multimode photographic camera using an interchangeable lens in which light intensity error in the film plane and light intensity error as measured at a position of a photometric element both depending on an individual interchangeable lens have been determined collectively as a primary quantity of error peculiar to this interchangeable lens relative to a reference lens, said interchangeable lens has been provided with its diaphragm value indices at positions deviating from the respective diaphragm value indices carried on the reference lens by said primary quantity of error peculiar to this particular interchangeable lens, the method comprising steps of providing said interchangeable lens with an AUTO position at a suitable angular distance from the minimum diaphragm value position of said interchangeable lens, taking out a signal representative of this AUTO position as an electric signal, and subjecting such electric signal together with the other exposure determining information such as brightness of an object to be photographed to arithmetic processing to effect display of a diaphragm value and/or a shutter speed in a shutter speed priority mode or in a programmed mode.

2. Method for display of diaphragm value and shutter speed in a multimode photographic camera using an interchangeable lens in which light intensity error in the film plane and light intensity error as measured at a position of a photometric element both depending on an individual interchangeable lens have been determined collectively as a primary quantity of error peculiar to this interchangeable lens relative to a reference lens, said interchangeable lens has been provided with its diaphragm value indices at a position deviating from the respective diaphragm value carried on the reference lens by said primary quantity of error peculiar to this particular interchangeable lens, the method comprising steps of providing said interchangeable lens with an AUTO position at a suitable angular distance from the minimum diaphragm value position of said interchangeable lens, taking out a signal representative of this AUTO position as an electric signal while transmitting an electric signal representative of the minimum aperture of said interchangeable lens from the lens to a camera body, and subjecting said electric signals corresponding to said AUTO position and said minimum aperture, respectively, together with the other exposure determining information such as brightness of an object to be photographed to arithmetic processing to effect display of a diaphragm value and/or a shutter speed in a shutter speed priority mode or in a programmed mode.

3. Method for exposure control in a multimode photographic camera comprising steps of applying a total quantity of error as a quantity of compensation to a diaphragm driving member or members associated therewith in the camera body so as to stop down the lens aperture to a desired diaphragm value, said total quantity of errors including errors in automatic diaphragm control caused by light intensity error in the film plane by an individual interchangeable lens with respect to a reference lens and light intensity error due to a position of a photometric element depending on said interchangeable lens, and errors caused by a different maximum aperture of each interchangeable lens; and subjecting information on an object to be photographed which is derived from the photometric element exposed to light coming from said object through the interchangeable lens together with the other exposure determining information such as a shutter speed to arithmetic processing to perform a diaphragm control in a shutter speed priority mode.

4. Method for exposure control in a multimode photographic camera using an interchangeable lens in which light intensity error in the film plane and light intensity error as measured at a position of a photometric element both depending on an individual interchangeable lens have been determined collectively as a primary quantity of error peculiar to this interchangeable lens relative to a reference lens, said interchangeable lens has been provided with its diaphragm value indices at positions deviating from the respective diaphragm value indices carried on the reference lens by said primary quantity of error peculiar to this particular interchangeable lens, the method comprising steps of providing said interchangeable lens with an AUTO position at a suitable angular distance from the minimum diaphragm value position of said interchangeable lens, taking out a signal representative of this AUTO position as an electric signal, subjecting such electric signal together with the other exposure determining information such as brightness of an object to be photographed to arithmetic processing to obtain an exposure quantity, and further subjecting this exposure quantity together with a programmed information representing a selected combination of diaphragm value and shutter speed to arithmetic processing to perform shutter speed and diaphragm control in a programmed mode.

5. A camera comprising:
a displaceable actuator;
a diaphragm adjustable between a maximum aperture value and a minimum aperture value responsive to displacement of the actuator;
means for generating a first signal representative of the displacement of the actuator;
means for generating a second signal representative of a fraction of an exposure quantity dependent on film sensitivity and subject light;
means responsive to the second signal for setting the exposure time of the camera;
means at least partially responsive to the second signal for generating a third signal representative of the desired aperture value of the diaphragm for correct exposure;
means for comparing the first and third signals;
means for displacing the actuator upon shutter release;
means for maintaining the diaphragm at the maximum aperture value during an initial portion of the displacement of the actuator; and
means responsive to the comparing means for arresting the displacement of the actuator when the first and second signals assume a predetermined relationship.

6. The camera of claim 5, in which the second signal generating means and the comparing means are disposed in a camera body and the diaphragm is disposed in an interchangeable lens assembly capable of being mounted on the camera body.

7. The camera of claim 6, in which the second signal generating means comprises means for generating a fourth signal representative of light entering the lens of the lens assembly, means for generating a fifth signal representative of film sensitivity, and means for combining the fourth and fifth signals.

8. The camera of claim 7, in which the second signal generating means additionally comprises means for generating a sixth signal representative of the individual characteristics of the lens and means for combining the sixth signal with the fourth and fifth signals.

9. The camera of claim 8, in which the third signal generating means comprises means for arithmetically combining the second, fourth, and fifth signals.

10. The camera of claim 9, additionally comprising means responsive to the second signal for displaying the desired diaphragm value.

11. The camera of claim 9, additionally comprising means responsive to the second signal for displaying the desired exposure time of the camera.

12. The camera of claim 11, additionally comprising means responsive to the second signal for displaying the desired diaphragm value of the camera.

* * * * *